Thomas W. Brown assignor to Hartshorn Brothers & Co.

Improved Grindstone Journal Box. REISSUED MAR 28 1871

4310

Witnesses

Henry N Pelton

P. Pollins

Thomas W. Brown

Hartshorn Brothers & Company by

Mathews & Butts

Their Attorneys

UNITED STATES PATENT OFFICE.

THOMAS W. BROWN, OF BOSTON, MASS., ASSIGNOR, BY MESNE ASSIGNMENTS, TO HARBSTER BROTHERS & COMPANY, OF READING, PA.

IMPROVEMENT IN GRINDSTONE-JOURNAL BOXES.

Specification forming part of Letters Patent No. 58,768, dated October 16, 1866; Reissue No. 4,310, dated March 28, 1871.

*To all whom it may concern:*

Whereas Letters Patent No. 58,768, dated October 16, A. D. 1866, have been granted to THOMAS W. BROWN for an Improvement in Grindstone-Journal Boxes, and such patent has been duly assigned to the undersigned, HARBSTER BROTHERS & COMPANY, of Reading, of the State of Pennsylvania; and whereas the said HARBSTER BROTHERS & COMPANY have duly applied or petitioned for a new patent to be issued to them to correct one or more defects or insufficiencies of the aforesaid patent, now, therefore, we, THOMAS W. BROWN, of the city of Boston and State of Massachusetts, and the said HARBSTER BROTHERS & COMPANY, do hereby declare the said invention to be particularly described as follows, reference being had to the accompanying drawings, which are to be considered as making part of our specification.

The invention relates to grindstone-journal boxes, and its purposes and utility will be perceived from the following specification.

The shafts of grindstones are ordinarily supported at each end upon the peripheries of two friction-wheels placed in close proximity, by the revolution of which, in conjunction and from contact with the grindstone-shaft, a large amount of friction is obviated. These wheels, however, are, if unprotected, liable to very great injury from the water, sand, and grit from the stone, and are apt to become unequally worn both upon their peripheries and journals. The improvement in question is intended to secure a more perfect and convenient protection for these wheels and their journals and the shaft of the grindstone in contact with them.

Figure 1:
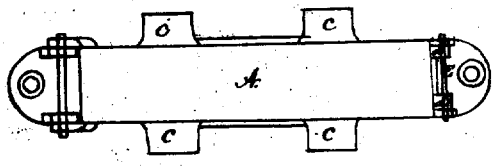
Figure 3:
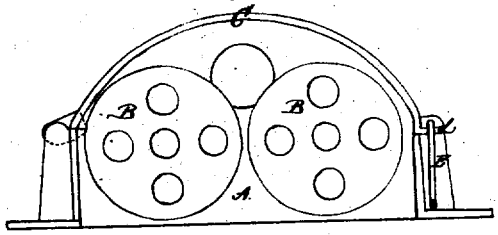
Figure 2:
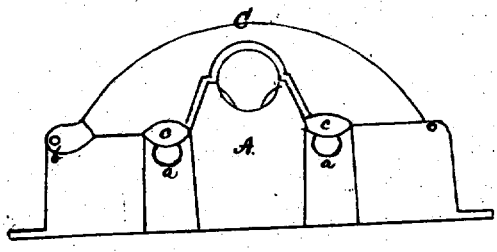
Figure 4:
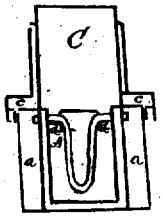

In the drawings, Figure 1 is a top view of the improved journal-box; Fig. 2, a side elevation; Fig. 3, a longitudinal section, and Fig. 4 an end view.

In the drawings, A is the box in which the two friction-wheels B B are arranged in manner as represented, their journals being supported in bearings *a a a a*, cast or formed at the sides of the box. With this box is a close cover, C, which may be hinged at one end, as shown at *b*. It extends over the peripheries of the wheels and down at the sides, so as, in connection with the box, completely to inclose the wheels. The cover also extends partially around the grindstone-shaft, so that, with the sides of the box, it embraces the grindstone-shaft so as nearly to touch it on all sides.

*c c c c* are projections formed so as to extend over the bearings of the friction-wheels. These projections may also be extended so as to hang down over and assist in protecting the ends of the journals of the friction-wheels in manner as shown in Fig. 2. This latter extension forms lips, which serve as guards to the ends of the journals to protect them from the dust and grit, and, besides, operate as scrapers to remove from the journal ends while in revolution any sand or grit that may accumulate or fall thereon, and which, were it not for the lip or lips, would be likely to settle on the journals and thence work into their bearings. Thus the journals, by means of the lips, will be protected to better advantage than by the projection over the journals alone.

The cover C at its free end is provided with an adjustable catch or fastening, a convenient form of which is shown in the drawings. Attached to the cover are projections *d d*, extending from it and between the two sides of the box, and so as to go underneath the bent arms of a fastener or catch, E, which is arranged at the end of the box, and springs over the projections and into holes made in the box-sides. The said fastener serves to hold the cover C down upon the box A. By turning the catch up into a horizontal position and compressing it together, so as to separate it from the box, we shall be able to turn the cover upward. By the use of an adjustable fastening the cover is more readily removed for the purpose of cleaning or oiling the wheels than it would be if screwed or otherwise permanently fastened to the box or frame of the machine.

We do not claim the friction-rollers, nor the box, nor cover for the same in themselves, as articles resembling them in some respects have been used separately before; but What we do claim is as follows:

1. The close protecting-box A, in combination with the friction-wheels B B and a cover, C, constructed so as to fit closely upon the said box, and with it completely inclose the friction-wheels and the grindstone-shaft, substantially as and for the purposes set forth.

2. The combination of the said box A, wheels B B, cover C, and projections extending over and protecting from above the journals of said friction-wheels, substantially as and for the purposes set forth.

3. The combination of the said box A, wheels B B, cover C, and projections *c c c c*, extending over and about and protecting from above and at the ends the journals of said friction-wheels, substantially as and for the purposes set forth.

4. The combination of the said box A, wheels B B, and cover C, with or without either of the above described and claimed projections, when said cover is provided with a hinge at one end, substantially as and for the purposes set forth.

5. The combination of the said box A, wheels B B, and cover C, when said cover is provided with an adjustable catch or fastener, by which the said cover may be secured to or released from the box at pleasure, substantially as and for the purposes set forth.

6. The arrangement of the spring-catch E with the projections *d d* from the cover and with the sides of the box, as specified.

7. The close protecting box and cover C, substantially as and for the purposes specified.

THOS. W. BROWN.
WILLIAM M. GUSCOM,
For HARBSTER BROS. & CO.

Witnesses:
A. T. YOUNG,
C. B. DREW.
Witnesses as to W. M. G.:
WASHINGTON RICHARDS,
HILAND H. BANKS.